(12) United States Patent
Li et al.

(10) Patent No.: US 12,737,221 B2
(45) Date of Patent: Sep. 15, 2026

(54) TASK OFFLOADING AND RESOURCE ALLOCATION METHOD IN UNCERTAIN NETWORK ENVIRONMENT

(71) Applicant: CHONGQING UNIVERSITY OF POSTS AND TELECOMMUNICATIONS, Chongqing (CN)

(72) Inventors: Yun Li, Chongqing (CN); Zhixiu Yao, Chongqing (CN); Shichao Xia, Chongqing (CN); Guangfu Wu, Chongqing (CN); Hongcheng Zhuang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 948 days.

(21) Appl. No.: 17/908,249

(22) PCT Filed: Nov. 4, 2021

(86) PCT No.: PCT/CN2021/128683

§ 371 (c)(1),
(2) Date: Aug. 31, 2022

(87) PCT Pub. No.: WO2022/257348

PCT Pub. Date: Dec. 15, 2022

(65) Prior Publication Data

US 2024/0103915 A1 Mar. 28, 2024

(30) Foreign Application Priority Data

Jun. 8, 2021 (CN) ......................... 202110635596.2

(51) Int. Cl.
*G06F 9/48* (2006.01)

(52) U.S. Cl.
CPC .................................. *G06F 9/4893* (2013.01)

(58) Field of Classification Search
CPC ........... G06F 9/4893; G06F 2209/5019; Y02D 30/70; H04W 24/02; H04W 24/06
See application file for complete search history.

(56) References Cited

U.S. PATENT DOCUMENTS 8,295,173 B2 * 10/2012 Larsson ................ H04L 45/124 370/231

FOREIGN PATENT DOCUMENTS

CN 108958916 A * 12/2018 ........... G06F 9/4806
CN 110035410 A 7/2019

(Continued)

OTHER PUBLICATIONS

International Search Report for PCT/CN2021/128683 mailed Feb. 25, 2022, ISA/CN.

(Continued)

*Primary Examiner* — Arpan P. Savla
(74) *Attorney, Agent, or Firm* — Yue (Robert) Xu; Apex Attorneys at Law, LLP

(57) ABSTRACT

A task offloading and resource allocation method in an uncertain network environment is provided. A task offloading process is modeled as a two-stage offloading model. The model is optimized to a task offloading and resource allocation problem based on two-stage stochastic programming. Based on a stochastic simulation algorithm, the task offloading and resource allocation problem is transformed to a sample mean approximation problem. The sample mean approximation problem is decoupled to a local computing resource allocation sub-problem, a transmission power and edge computing resource joint allocation sub-problem, and an offloading decision sub-problem. The three sub-problems are solved respectively by using a standard Lagrange mul- (Continued)

tiplier algorithm, by using a genetic algorithm, and by analyzing delay estimation and energy consumption budget of local computing and delay estimation and energy consumption budget of edge computing. The user performs task offloading based on an optimal allocation strategy obtained by solving the three sub-problems.

9 Claims, 3 Drawing Sheets

(56) References Cited

FOREIGN PATENT DOCUMENTS

| | | | | |
|---|---|---|---|---|
| CN | 110430593 A | * | 11/2019 | ........... H04B 17/336 |
| CN | 113115339 A | * | 7/2021 | ............ H04W 24/02 |
| CN | 113242568 A | | 8/2021 | |
| EP | 3605329 A1 | | 2/2020 | |

OTHER PUBLICATIONS

Yao, zhixiu, Research on Resource Allocation in Mobile Edge Computing Based on Game Theory, Mar. 26, 2020.

* cited by examiner

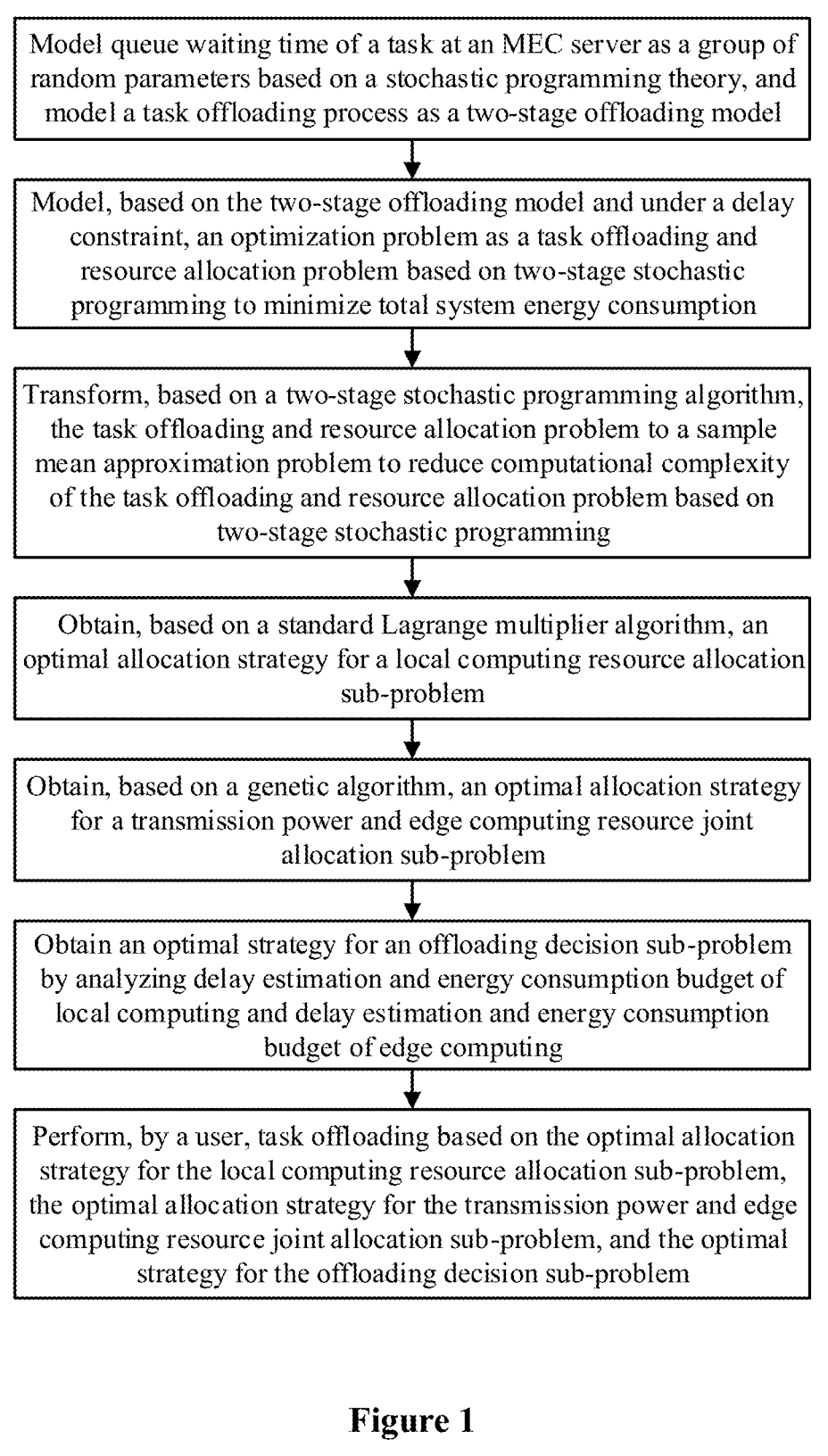

Model queue waiting time of a task at an MEC server as a group of random parameters based on a stochastic programming theory, and model a task offloading process as a two-stage offloading model

↓

Model, based on the two-stage offloading model and under a delay constraint, an optimization problem as a task offloading and resource allocation problem based on two-stage stochastic programming to minimize total system energy consumption

↓

Transform, based on a two-stage stochastic programming algorithm, the task offloading and resource allocation problem to a sample mean approximation problem to reduce computational complexity of the task offloading and resource allocation problem based on two-stage stochastic programming

↓

Obtain, based on a standard Lagrange multiplier algorithm, an optimal allocation strategy for a local computing resource allocation sub-problem

↓

Obtain, based on a genetic algorithm, an optimal allocation strategy for a transmission power and edge computing resource joint allocation sub-problem

↓

Obtain an optimal strategy for an offloading decision sub-problem by analyzing delay estimation and energy consumption budget of local computing and delay estimation and energy consumption budget of edge computing

↓

Perform, by a user, task offloading based on the optimal allocation strategy for the local computing resource allocation sub-problem, the optimal allocation strategy for the transmission power and edge computing resource joint allocation sub-problem, and the optimal strategy for the offloading decision sub-problem

Figure 1

TASK OFFLOADING AND RESOURCE ALLOCATION METHOD IN UNCERTAIN NETWORK ENVIRONMENT

The present application is the national phase of International Patent Application No. PCT/CN2021/128683, titled "TASK OFFLOADING AND RESOURCE ALLOCATION METHOD IN UNCERTAIN NETWORK ENVIRONMENT", filed on Nov. 4, 2021, which claims priority to Chinese Patent Application No. 202110635596.2, titled "TASK OFFLOADING AND RESOURCE ALLOCATION METHOD IN UNCERTAIN NETWORK ENVIRONMENT", filed on Jun. 8, 2021 with the Chinese Patent Office, both of which are incorporated herein by reference in their entireties.

FIELD

The present disclosure relates to the technical field of wireless communication, and in particular to a task offloading and resource allocation method in an uncertain network environment.

BACKGROUND

With the rapid development of internet of things technology and the popularization of 5G/6G new applications, delay sensitive applications have been widely envisaged. For example, virtual reality, unmanned driving, face recognition and the like are developing at an unprecedented speed. With the Mobile Edge Computing (MEC) technology, tasks are offloaded to a network edge node such as a base station and a wireless access point, ensuring inherent low delay for delay-sensitive applications.

According to the mobile edge computing technology, a task offloading and resource allocation strategy is often a key factor affecting an offloading delay and energy consumption of users. In order to improve the Quality of Experience (QoE) of the users and minimize the computing offloading energy consumption, it is required to determine a task offloading and resource allocation strategy based on performance constraints such as a computing energy consumption budget and a computing delay of a task, and available resources of an MEC server. Researchers in China and abroad conducted a lot of in-depth researches on the above problem, and obtained the following results.

(1) A task allocation and computing frequency task algorithm in a mobile edge computing process is obtained. In the algorithm, a scenario in which a single user offloading tasks to multiple MEC servers is considered, and the task computing delay and the user energy consumption are minimized based on optimization a task offloading decision and a frequency of a central process unit (CPU) of the user.

(2) A joint task offloading and radio resource allocation algorithm is obtained. In the algorithm, joint optimization is performed on a task offloading decision, a transmission power and a channel allocation process in a scenario including multiple users and multiple MEC servers to minimize the energy consumption of all the users under a task computing delay constraint.

Task computing delay is an important indicator ensuring QoE of the user. In all the above researches, task computing delay is considered. However, a queuing delay of a task queue of the MEC server is ignored. In an actual MEC network environment, the MEC server is usually unable to quickly respond to massive burst computing requests due to that the computing resources and storage resources of the MEC server are very limited. Therefore, the queue waiting time of tasks on the MEC server side cannot be ignored. Due to the randomness of task arrival and the time variability of the task queue of the MEC server, it is unrealistic to obtain an accurate prediction of the task queue waiting time, resulting in a severe challenge to the conventional task offloading and resource allocation. In addition, most of the researches only focus on the energy consumption at the user side. The MEC server with limited computing resources is to be accessed by a large number of computing-intensive and delay-sensitive users, resulting in problems such as lack of computing resources and high energy consumption. Therefore, how to determine an efficient and green task offloading and resource allocation strategy in an MEC network environment with an uncertain task computing delay has important research value.

SUMMARY

In order to solve the problem of the uncertain computing delay due to the random queue waiting time of a task at the MEC server, a task offloading and resource allocation method in an uncertain network environment is provided according to the present disclosure. The method includes: modeling queue waiting time of a task at an MEC server as a group of random parameters based on a stochastic programming theory, and modeling a task offloading process as a two-stage offloading model; modeling, based on the two-stage offloading model and under a delay constraint, an optimization problem as a task offloading and resource allocation problem based on two-stage stochastic programming to minimize a total system energy consumption; transforming, based on a stochastic simulation algorithm, the task offloading and resource allocation problem based on two-stage stochastic programming to a sample mean approximation problem; decoupling the sample mean approximation problem to a local computing resource allocation sub-problem, a transmission power and edge computing resource joint allocation sub-problem, and an offloading decision sub-problem; obtaining, based on a standard Lagrange multiplier algorithm, an optimal allocation strategy for the local computing resource allocation sub-problem; obtaining, based on a genetic algorithm, an optimal allocation strategy for the transmission power and edge computing resource joint allocation sub-problem; obtaining an optimal strategy for the offloading decision sub-problem by analyzing delay estimation and energy consumption budget of local computing and delay estimation and energy consumption budget of edge computing; and performing, by a user, task offloading based on the optimal allocation strategy for the local computing resource allocation sub-problem, the optimal allocation strategy for the transmission power and edge computing resource joint allocation sub-problem, and the optimal strategy for the offloading decision sub-problem.

Further, in the two-stage offloading model, an offloading decision process includes two stages. In a first stage, a decision variable is a transmission power of the task, where in a case that the user does not obtain uncertain queue waiting time at the MEC server, a transmission power allocation strategy $p_i$ in the first stage is determined based on influence of all possible queue waiting time in future. In a second stage, a decision variable is CPU frequency resource of the MEC server, where the queue waiting time is obtained after the task is uploaded to the MEC server, and then the MEC server, after obtaining the queue waiting time and the transmission power allocation strategy $p_i$ in the first stage, performs an recourse operation based on the delay constraint to compensate for the transmission power allocation strategy in the first stage.

Further, in a case that a task offloading decision of the (i)th user is 1, that is, the (i)th user offloads the task to the server for computing, an optimal offloading strategy is calculated based on the genetic algorithm by:

performing floating-point vector coding on each of feasible transmission powers, where each of floating-point vectors represents a chromosome, and a dimension of the floating-point vector is consistent with a dimension of a solution vector;

randomly generating a point from a feasible region of a transmission power of the (i)th user; determining whether the point meets a constraint that a transmission delay of the user is less than a maximum transmission delay requirement; in a case that the point meets the constraint, determining the point as a chromosome; in a case that the point does not meet the constraint, generating another random point until the another random point meets the constraint; and repeating the above processing M times to generate M chromosomes as an initial population, where the M chromosomes is expressed as: $p_{i,1}, p_{i,2}, \ldots, p_{i,M}$;

for each of the chromosomes $p_{i,m}$, solving a fitness function of the chromosome and calculating an evaluation function of the chromosome based on a fitness of the chromosome, where a greater value of the evaluation function of the chromosome indicates that a possibility of the chromosome is selected to generate offspring is greater, and the fitness is a sample mean approximation problem function;

for the chromosome $p_{i,m}$, calculating a cumulative probability of first m chromosomes by using the following equation:

$$q_{i,m} = \sum_{j=1}^{m} eval(p_{i,j}),\ m = 1, 2, \ldots, M$$

for the chromosome $p_{i,m}$ generating a random number r from an interval $(0, q_{i,M})$, selecting the chromosome $p_{i,m}$ as a parent sample to reproduce a next generation of chromosomes in a case that $q_{i,m-1}<r<q_{i,m}$ and $q_{i,0}=0$, and selecting M chromosomes according to the above processing;

defining $P_c$ as a crossover probability, where an expected number $P_c$*M of chromosomes in the population perform crossover operation, that is, assuming that $p_{i,1}$ and $p_{i,2}$ are two chromosomes to perform crossover operation, a random number c is generated from an interval (0,1) until $$p'_{i,1} = cp_{i,1} + (1-c)p_{i,2}$$

and $$p'_{i,2} = (1-c)p_{i,1} + cp_{1,2}$$

meet the constraint that the transmission delay of the user is less than the maximum transmission delay requirement, then $$p'_{i,1} \text{ and } p'_{i,2}$$

replace the original chromosomes $p_{i,1}$ and $p_{i,2}$;

defining $P_u$ as a mutation probability, where an expected number $P_c$*M of chromosomes in the population perform mutation operation, that is, assuming that $p_{i,1}$ is a chromosome to perform mutation operation, a mutation direction d is randomly selected, a random number α is generated from $$(0, p_i^{max}) \text{ until } p'_{i,1} = p_{i,1} + \alpha d$$

meets the constraint, then $$p'_{i,1}$$

replaces the original chromosome $p'_{i,1}$; and obtaining a new population after the selection operation, the crossover operation and the mutation operation, and preparing for a next evolution; in a case that the number of cycles of the above operations reaches a predetermined number of cycles, stopping the genetic algorithm; and selecting, after stopping the genetic algorithm, a chromosome having a highest fitness from a last generation of chromosomes to obtain a global optimal solution of the optimization problem.

For the problem of the uncertain computing delay due to random queue waiting time of a task at an edge server in mobile edge computing, a task offloading and resource allocation method in an uncertain network environment is provided according to the present disclosure. Firstly, under a delay constraint, an optimization problem is modeled as a two-stage stochastic programming problem to minimize total system energy consumption. Secondly, in order to reduce the computing complexity of the two-stage stochastic programming problem, the two-stage stochastic programming problem is transformed, by using a stochastic simulation algorithm, to a mixed integer nonlinear programming problem based on sample mean approximation, and the mixed integer nonlinear programming problem is decoupled to three sub-problems: a local computing resource allocation sub-problem, a transmission power and edge computing resource joint allocation sub-problem, and an offloading decision sub-problem. Then, an optimal allocation strategy for the local computing resource allocation is obtained based on a Lagrange multiplier algorithm, and an optimal allocation strategy for the transmission power and edge computing resource joint allocation is obtained based on a genetic algorithm. Finally, an optimal task offloading decision is obtained by analyzing delay estimation and energy consumption budget of local computing and delay estimation and energy consumption budget of edge computing. It is shown based on simulation experiments that, compared with the conventional method, with the method according to the present disclosure, the requirements for task computing delay in a network with an uncertain delay can be met, and minimization system energy consumption is achieved.

BRIEF DESCRIPTION OF THE DRAWINGS

FIG. 1 is a flowchart of a task offloading and resource allocation method in an uncertain network environment according to the present disclosure;

DETAILED DESCRIPTION OF THE EMBODIMENTS

Figure 2:
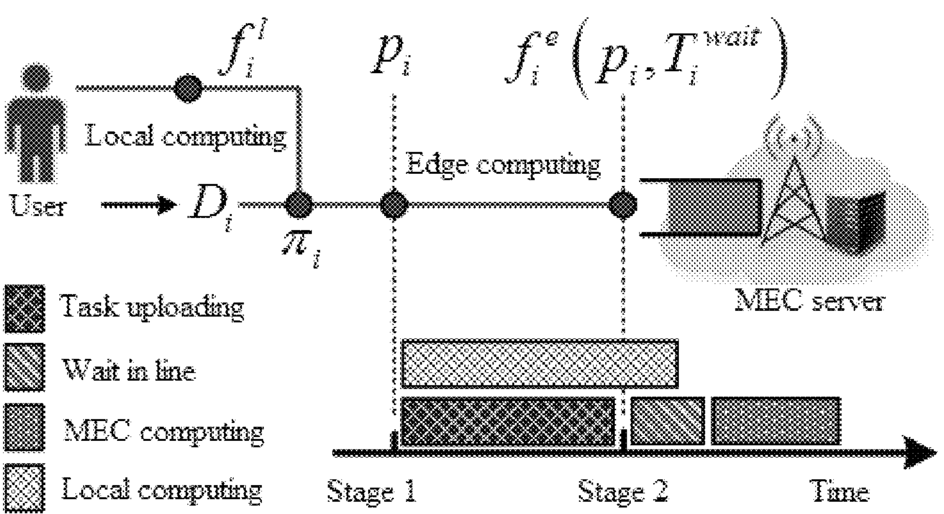
FIG. 2 is a schematic diagram of a two-stage offloading model according to the present disclosure.

A task offloading and resource allocation method in an uncertain network environment is provided according to the embodiments of the present disclosure, to solve the problem of uncertain computing delay due to random queue waiting time of a task at an edge server in mobile edge computing.

The embodiments of the present disclosure are described in combination of the drawings.

In the specification, the claims and the drawings of the present disclosure, terms such as "first" and "second" are merely for distinguishing similar objects rather than describing a specific order or sequence. It should be understood that the terms used in this way may be interchanged in appropriate cases, and the terms are used to distinguish objects with the same attributes in the embodiments of the present application in describing the objects. In addition, the terms "include" and "comprise" and any variations thereof are intended to be non-exclusive, so that a process, method, system, product or device including a series of units includes not only the units but also other units that are not enumerated, or also include units inherent in the process, method, product or device.

A task offloading and resource allocation method in an uncertain network environment is provided according to the present disclosure. As shown in FIG. 1, the method includes the following steps. Queue waiting time of a task at an MEC server is modeled as a group of random parameters based on a stochastic programming theory, and a task offloading process is modeled as a two-stage offloading model. An optimization problem is modeled, based on the two-stage offloading model and under a delay constraint, as a task offloading and resource allocation problem based on two-stage stochastic programming to minimize total system energy consumption. The task offloading and resource allocation problem based on two-stage stochastic programming is transformed, based on a stochastic simulation algorithm, to a sample mean approximation problem. The sample mean approximation problem is decoupled to a local computing resource allocation sub-problem, a transmission power and edge computing resource joint allocation sub-problem, and an offloading decision sub-problem. An optimal allocation strategy for the local computing resource allocation sub-problem is obtained based on a standard Lagrange multiplier algorithm. An optimal allocation strategy for the transmission power and edge computing resource joint allocation sub-problem is obtained based on a genetic algorithm. An optimal strategy for the offloading decision sub-problem is obtained by analyzing delay estimation and energy consumption budget of local computing and delay estimation and energy consumption budget of edge computing. The user performs task offloading based on the optimal allocation strategy for the local computing resource allocation sub-problem, the optimal allocation strategy for the transmission power and edge computing resource joint allocation sub-problem, and the optimal strategy for the offloading decision sub-problem.

In this embodiment, an MEC system model is considered. The model includes a base station provided with a server and N users requesting task processing. A set N is expressed as N={1,2, . . . , N}. UEi represents an (i)th user, where i∈N. UEs may communicate with the MEC server through a wireless network. It is assumed that the task required to be processed by the user is a triple $A_i=\{D_i, L_i, \tau_i\}$, where $D_i$ represents the size of the task to be computed, $L_i$, in cycles/bit, represents the number of CPU cycles required by per bit of task, and $\tau_i$, represents a maximum delay for computing the task. Assuming that the task is indivisible, $\pi_i\in\{0,1\}$ representing an offloading decision of UEi. In a case that the task is computed locally, $\pi_i\in=0$. In a case that the task is offloaded to the MEC server for processing, $\pi_i=1$.

In some implementations, a processor of each of the users supports dynamic voltage frequency scaling (DVFS) technology. With the DVFS technology, a CPU frequency can be dynamically adjusted to reduce power consumption. A delay in local computing is expressed as:

$$T_i^{loca}(f_i^l) = \frac{D_i L_i}{f_i^l}. \tag{1}$$

and a computing energy consumption of the UEi in a case of local computing is expressed as:

$$C_i^{loca}(f_i^l) = \kappa_i (f_i^l)^2 T_i^{loca} \tag{2}$$

where $$f_i^l$$

represents the CPU frequency of the UEi in performing local computing, and is represents an effective energy coefficient related to the chip architecture of the UEi.

In some implementations, the user offloads a task to the MEC server for processing, including four processes: a task uploading process, a queuing at the MEC server process, an MEC server computing process, and a return computing result process. Due to the small size of task of returning a result, in order to facilitate analysis, a communication delay in returning the computing result is ignored in the present disclosure. A transmission rate at which the UEi offloads the task to the MEC server is expressed as:

$$R_i(p_i) = B_0 \log_2\left(1 + \frac{h_i p_i}{N_0 B_0}\right) \tag{3}$$

where $B_0$ represents a communication bandwidth, $h_i$ represents a channel gain between UEi and the MEC server, $N_0$ represents a Gaussian white noise power spectrum, and $p_i$ represents the transmission rate at which the UEi offloads the task. Therefore, in a case that the UEi offloads the task to the MEC server for processing, a communication delay of uploading the task is expressed as:

$$T_i^{tran}(p_i) = \frac{D_i}{R_i(p_i)} \tag{4}$$

In some implementation, after the task is uploaded to the MEC server, the MEC server, due to the limited computing resources of the MEC server, usually cannot quickly respond to a sudden computing request. Therefore, the queue waiting time at the MEC server cannot be ignored.

$$T_i^{waat}$$

represents the queue waiting time for the UEi at the MEC server. After the task is queued, the MEC server provides a computing service for the task.

$$f_i^e$$

represents a CPU frequency of the MEC server for processing the task. A computing delay for the UEi at the MEC server is expressed as:

$$T_i^{comp}(f_i^e) = \frac{D_i L_i}{f_i^e}. \tag{6}$$

Further, a computing energy consumption of the MEC server in providing a computing service for the UEi in a case of edge computing is expressed as:

$$C_i^{comp}(f_i^e) = \gamma (f_i^e)^2 T_i^{comp}(f_i^e). \tag{7}$$

where γ represents an effective energy coefficient related to the chip architecture of the MEC server.

First Embodiment

Modeling of task offloading and resource allocation problem based on two-stage stochastic programming is provided in this embodiment.

In the embodiments of the present disclosure, due to the randomness of task arrival and time variability of the task queue at the MEC server, it is unrealistic to obtain an accurate prediction of queue waiting time of a task. In this embodiment, the uncertainty of the queue waiting time is analyzed, and then an optimization problem is modeled as a task offloading and resource allocation problem based on two-stage stochastic programming meeting a computing delay requirement of the user to minimize total system energy consumption. Thus, the following processing is included.

(1) Analysis of Uncertainty of the Queue Waiting Time

In some implementations, in order to deal with the uncertainty of the queue waiting time at the MEC server, the uncertain queue waiting time is modeled as a group of random parameters described by a probability distribution based on a stochastic programming theory according to the present disclosure. Generally, it is assumed that the queue waiting time at the MEC server is exponentially distributed. $\Omega_i$ represents a set of all possible queue waiting time in a case that UEi offloads the task to the MEC server, which is referred to as a scenario.

$$T_i^{wait} \in \Omega_i$$

representing an implementation in the scenario. Further, considering all the UEs, a combination scenario $\Omega_i$ is defined to represent a set of queue waiting time of all the UEs at the MEC server, and the combination scenario Ω may be expressed as a Cartesian product:

$$\Omega = \prod_{i=1}^{N} \Omega_i$$

$$\omega = (T_i^{watt}, T_2^{watt}, \ldots ,_N^{watt}) \in \Omega$$

representing a combination implementation in the combination scenario.

(2) Construction of the Task Offloading and Resource Allocation Based on Two-Stage Stochastic Programming According to the present disclosure, with meeting a processing delay requirement of the user, the total system energy consumption is minimized by optimizing the CPU frequency resources and the task transmission power of local and the MEC server and optimizing the task offloading decision. As shown in FIG. 2, in some feasible implementations, in a case that the user does not observe the uncertain queue waiting time at the MEC server, the user considers the impact of all possible queue waiting time, and obtains an offloading decision 71 after comparing the energy consumption budget and delay estimation in local computing and the energy consumption budget and delay estimation in edge computing. In a case that the user offloads the task to the MEC server for processing, the offloading decision process is divided into the two following stages based on two-stage stochastic programming according to the present disclosure.

(1) In a first stage, a decision variable is a transmission power of the task. In a case that the user does not obtain uncertain queue waiting time at the MEC server, a transmission power allocation strategy $p_i$ in the first stage is determined based on influence of all possible queue waiting time in future.

(2) In a second stage, a decision variable is CPU frequency resource of the MEC server. After the task is uploaded to the MEC server, the queue waiting time is obtained. After obtaining the queue waiting time $$T_i^{wait}$$

and the strategy $p_i$ in the first stage, the MEC server performs an recourse operation $$f_i^e(p_i, T_i^{wait})$$

based on a constraint (for example, an offloading delay) to improve the inaccurate prediction based on the strategy in the first stage.

Based on the above analysis, an expectation model of the task offloading and resource allocation based on two-stage stochastic programming is obtained, which is expressed as:

$$P1: \min_{\pi, f^l, f^e, p}: \underbrace{\sum_{i=1}^{N}(1-\pi_i)\kappa_i D_i L_i f_i^l}_{local\ computing} + \underbrace{\sum_{i=1}^{N}\pi_i \frac{D_i p_i}{R_i(p_i)}}_{first\ stage\ of\ edge\ computing} + \underbrace{\mathbb{E}_{\Omega}\left[\sum_{i=1}^{N}\pi_i \gamma D_i L_i f_{i,\omega}^e\left(p_i, T_i^{wait}(\omega)\right)\right]}_{second\ stage\ of\ edge\ computing} \tag{8}$$

and the target functions include:

$$p_i^{min} \le p_i \le p_i^{max}, \tag{8-a}$$

$$f_i^{l,min} \le f_i^l \le f_i^{l,max}, \tag{8-b}$$

$$f^{e,min} \le f_i^l \le f^{e,max}, \tag{8-c}$$

$$T_i^{loca}(f_i^l) \le \tau_i, \tag{8-d}$$

$$T_i^{tran}(p_i) + T_i^{wait}(\omega) + T_i^{comp}\left(f_{i,\omega}^e \mid p_i, T_i^{wait}(\omega)\right) \le \tau_i, \quad \forall\, \omega \in \Omega, \text{ and} \tag{8-e}$$

$$\pi_i \in \{0, 1\} \tag{8-f}$$

where $\pi=\{\pi_1, \pi_2, \ldots \pi_N\}$ representing a set of task offloading decisions;

$$f^l = \{f_1^l, f_2^l, \ldots, f_N^l\}$$

representing a set of local CPU frequency resource allocation strategies;

$$f^e = \{f_{1,\Omega}^e, f_{2,\Omega}^e, \ldots, f_{N,\Omega}^e\}$$

representing a set of CPU frequency resource allocation strategies of the MEC server in all combination scenarios, where $$f_{i,\Omega}^e = \{f_{i,\omega_1}^e, f_{i,\omega_2}^e, \ldots\};\ p = \{p_1, p_2, \ldots p_N\}$$

representing a set of task transmission power allocation strategies of UEs; $E_\Omega[\bullet]$ represents an expectation of the combination scenarios;

$$p_i^{min}$$

represents a minimum transmission power;

$$p_i^{max}$$

represents a maximum transmission power;

$$f_i^{l,min}$$

represents a minimum local CPU frequency;

$$f_i^{l,max}$$

represents a maximum local CPU frequency; $f^{e,\ min}$ represents a minimum CPU frequency of the MEC server; $f^{e,\ max}$ represents a maximum CPU frequency of the MEC server; and $$T_i^{wait}(\omega)$$

represents the queue waiting time of UEi in a case that a combination is implementation as ω. The constraint equation (8-d) indicates that a time period in which a task is performed locally is required to meet a corresponding delay requirement, and the constraint equation (8-e) indicates that a time period in which a task is performed at the MEC server is required to meet a corresponding delay requirement.

Second Embodiment

In this embodiment, in order to reduce the computational complexity of the two-stage stochastic programming process in the first embodiment, the expectation model in the problem P1 is transformed to a MINLP problem based on sample mean approximation. Then, the MINLP problem is decoupled to a local computing resource allocation sub-problem, a transmission power and edge computing resource joint allocation sub-problem, and an offloading decision sub-problem. Thus, the following processing is included.

(1) Transformation of the Expectation Model in the Problem P1 to the MINLP Problem Based on Sample Mean Approximation In the present disclosure, the optimization of task offloading and resource allocation under the environment in which queue waiting time at the MEC server is uncertain is considered, and the optimization problem is modeled as a two-stage stochastic programming problem. However, in performing the two-stage stochastic programming problem, a challenge of "dimension disaster" is usually encountered, resulting in high computational complexity. For example, in a case that the number of scenario spaces Ω, of the user is 1000, the number of combination scenarios Ω reaches $1000^N$. It is difficult and unrealistic to solve the two-stage stochastic programming problem with such a large number of scenarios.

In some feasible implementations, in order to solve the problem of "dimension disaster" in the two-stage stochastic programming, in the present disclosure, K independent and identically distributed samples are extracted from a scenario space, based on a stochastic simulation algorithm to form a sample scenario $$\Omega_i' = \{T_{i,1}^{wait}, T_{i,2}^{wait}, \ldots, T_{i,K}^{wait}\} \in \Omega_i, \text{ where } T_{i,k}^{wait}$$

represents a (k)th implementation in the sample scenario. Further, considering all the users, a sample combination scenario $\Omega'=\{\omega_1, \omega_2, \ldots, \omega_S\}$ based on the sample space is obtained, where $S=K^N$ representing the number of the sample combination scenarios, and co represents an (s)th combination implementation in the sample combination scenario. Then, the expectation model in problem P1 is approximated to a sample mean model based on the sample mean approximation algorithm, which is expressed as:

$$P2:\ \underset{\pi,f^l,f^e,p}{\text{Min}}:\ \underbrace{\sum_{i=1}^{N}(1-\pi_i)\kappa_i D_i L_i f_i^l}_{\text{local computing}}+\underbrace{\sum_{i=1}^{N}\pi_i\frac{D_i p_i}{R_i(p_i)}}_{\text{first stage of edge computing}}+\underbrace{\frac{1}{S}\sum_{s=1}^{S}\sum_{i=1}^{N}\pi_i\gamma D_i L_i f_{i,\omega_s}^e\left(p_i,T_i^{wait}(\omega_s)\right)}_{\text{second stage of edge computing}} \tag{9}$$

and the target conditions include the above equations (8-a) to (8-f).

In the optimization problem P2, $\pi_i$ is a binary decision variable of {0,1}, and the target functions in the first stage of the edge computing are nonlinear functions about $p_i$. Therefore, the optimization problem P2 is an MINLP problem and an NP hard problem. Since the local computing resource allocation variable $f^l$, the transmission power allocation variable p and the edge computing resource allocation variable $f^e$, and the offloading decision variable $\pi$ are completely decoupled, in order to solve the MINLP problem, the optimization problem P2 is decoupled to a local computing resource allocation sub-problem, a transmission power and edge computing resource joint allocation sub-problem, and an offloading decision sub-problem to be solved in the present disclosure. For the convenience of analysis, an optimal strategy, only for one user, is solved in the present disclosure. Since the users are independent of each other, the optimal strategy is easily to be extended to a multi-user scenario.

(2) Local Computing Resources Allocation

Exemplarily, it is assumed that the offloading decision variable $\pi$=0, that is, UEi determines to process the task locally, thus the optimization problem P2 may be written as a local computing resource allocation sub-problem, which is expressed as:

$$\text{P2-1: }\underset{f_i^l}{\text{Min}}:\kappa_i D_i L_i f_i^l \tag{10}$$

and the constraint includes the above equations (8-b) to (8-d).

In the optimization problem P2-1, the target function is an affine function about $$f_i^l,$$

and the constraint equation (8-c) is a convex constraint about $$f_i^l.$$

Therefore, the optimization problem P2-1 is a convex programming problem. The optimization problem P2-1 is solved with a Lagrange multiplier algorithm, and a Lagrange function is defined as:

$$g_i(f_i^l,\mu_i,\lambda_i,v_i)= \tag{11}$$

-continued $$\kappa_i D_i L_i f_i^l+\mu_i\left(f_i^{l,min}-f_i^l\right)+\lambda_i\left(f_i^l-f_i^{l,max}\right)+v_i\left(\frac{D_i L_i}{f_i^l}-\tau_i\right)$$

where $\mu_i \geq 0$, $\lambda_i \geq 0$, and $v_i \geq 0$, and each of the three parameters represents a Lagrange multiplier. Further, a KKT (Karush-Kuhn-Tucker) condition for the problem equation (X) is obtained, which is expressed as:

$$\begin{cases}\dfrac{\partial g_i(f_i^l,\mu_i,\lambda_i,v_i)}{\partial f_i^l}\Big|_{f_i^l=f_i^{l*}}=0\\ \mu_i\left(f_i^{l,min}-f_i^{l*}\right)=0\\ \lambda_i\left(f_i^{l*}-f_i^{l,max}\right)=0\\ v_i\left(T_i^{loca}(f_i^{l*})-\tau_i\right)=0\\ f_i^{l,min}\leq f_i^{l*}\leq f_i^{l,max}\\ T_i^{loca}(f_i^{l*})\leq\tau_i\end{cases} \tag{12}$$

By solving the KKT conditions, a closed expression of the optimal CPU frequency allocation strategy in a case that the task is computed locally is obtained, which is expressed as:

$$f_i^{l*}=\text{Max}\left\{\text{Min}\left\{\frac{D_i L_i}{\tau_i},f_i^{l,max}\right\},f_i^{l,min}\right\} \tag{13}$$

(3) Transmission Power and Edge Computing Resource Joint Allocation

Exemplarily, it is assumed that the offloading decision variable $\pi$=1, that is, UEi determines to offload the task to the MEC server for computing, thus the optimization problem P2 may be written as a transmission power and edge computing resource allocation sub-problem, which is expressed as:

$$P2\text{-}2:\ \underset{f_{i,\Omega'}^e,p_i}{\text{Min}}:\ \underbrace{\frac{D_i p_i}{R_i(p_i)}}_{\text{first stage of edge computing}}+\underbrace{\frac{1}{S}\sum_{s=1}^{S}\gamma D_i L_i f_{i,\omega_s}^e\left(p_i,T_i^{wait}(\omega_s)\right)}_{\text{second stage of edge computing}} \tag{14}$$

and the constraint includes the above equations (8-a), (8-c) and (8-e).

In the optimization problem (12), the target function in the first stage of the edge computing is a non-convex function about $p_i$. Therefore, a global optimal solution of the problem P2-2 is solved based on a genetic algorithm in the present disclosure. The genetic algorithm is a global optimization algorithm inspired by biological evolution theory, and is especially applicable to high-dimensional decision problems.

Third Embodiment

In this embodiment, the global optimal solution of the problem P2-2 is solved based on the genetic algorithm, including the following steps (1) to (7).

Step (1), Coding

In the two-stage offloading model, a task transmission power in the first stage is determined. Therefore, floating-point vector coding is performed on each of feasible transmission powers according to the present disclosure. Each of floating-point vectors represents a chromosome, and a dimension of the floating-point vector is consistent with a dimension of a solution vector.

Step (2), Population Initialization

M represents a population size, and M chromosomes are randomly generated in an initialization process. A point is randomly generated from a feasible region of transmission power of the user, and it is determined whether the point meets a constraint. In a case that the point meets the constraint, the point is determined as a chromosome. In a case that the point does not meet the constraint, another random point is generated until the another random point meets the constraint. The above processing is repeated M times to generate M chromosomes as an initial population, which is expressed as $p_{i,1}, p_{i,2}, \ldots, p_{i,M}$.

Step (3), Evaluation Function

The evaluation function is used for setting a probability for each of chromosomes in the population, so that possibility of a chromosome being selected is proportional to fitness of other chromosomes in the population. A chromosome with a strong fitness is more likely to be selected to generate offspring. In the present disclosure, an optimal value of the optimization problem P2-2 is used as a fitness of a chromosome. An order is determined based on values of the fitness, and the probability of a chromosome being selected is determined according to the order. A smaller optimal value indicates a stronger fitness, that is, the probability of a chromosome, having a smaller optimal value, is more likely to breed a next generation as a male parent. Specifically, for a chromosome $p_{i,m}$ where m=1, 2, . . . ,M, an optimal value of a target function of the following minimization problem is solved as a fitness of the chromosome by using the following equation:

$$\underset{f^e_{i,\Omega'}}{\text{Min}}: \underbrace{\frac{D_i p_{i,m}}{R_i(p_{i,m})}}_{\substack{\text{first stage of}\\ \text{edge computing}}} + \underbrace{\frac{1}{S}\sum_{s=1}^{S}\gamma D_i L_i f^e_{i,\omega_s}\left(p_{i,m}, T_i^{wait}(\omega_s)\right)}_{\substack{\text{second stage of}\\ \text{edge computing}}} \tag{15}$$

and S.t. includes the above equations (8-c) and (8-e).

In the optimization problem equation (15), the target value in the first stage of the edge computing is a constant, and the target function in the second stage of the edge computing is an affine function about $$f^e_{i,\omega_s}.$$

The constraint equation (8-d) is a convex constraint about $$f^e_{i,\omega_s}.$$

Therefore, the optimization problem equation (15) is a convex programming problem. Similarly, a closed expression of an optimal CPU frequency allocation strategy of the MEC server in each of the scenarios is obtained by using the Lagrange multiplier algorithm and under the KKT conditions, and the closed expression is expressed as:

$$f^{e*}_{i,\omega_s} = \text{Max}\left\{\text{Min}\left\{\frac{D_i L_i}{\tau_i - T_i^{tran}(p_{i,m}) - T_i^{wait}(\omega_s)}, f^{e,max}\right\}, f^{e,min}\right\} \tag{16}$$

Optimal CPU frequencies in all the scenarios are inputted to the equation (15) to obtain fitness of all the chromosomes, and the chromosomes are sorted in an ascending order of the fitness. Based on the above operations, the evaluation function is defined as:

$$\text{eval}(p_{i,m})=a(1-a)^{m-1}=m=1,2, \ldots ,M \tag{17}$$

where $\alpha \in (0,1)$ For the chromosome $p_{i,m}$, a larger value of the evaluation function indicates a large possibility of the chromosome being selected to generate offspring.

Step (4), Selection

For a chromosome $p_{i,m}$, cumulative probabilities of first m chromosomes are calculated by using the following equation:

$$q_{i,m} = \sum_{j=1}^{m} eval(p_{i,j}),\ m = 1, 2, \ldots , M$$

and a random number r is generated from an interval $(0, q_{i,M})$. In a case that $q_{i,m-1}<r<q_{i,m}$ and $q_{i,0}=0$, the chromosome $p_{i,m}$ is selected as a male parent to reproduce a next generation of chromosomes. M chromosomes are selected according to the above processing.

Step (5), Crossover $P_c$ is defined as a crossover probability. An expected number $P_c$*M of chromosomes in the population perform crossover operation. Assuming that $p_{i,1}$ and $p_{i,2}$ are two chromosomes to perform crossover operation, a random number c is generated from an interval (0,1) until $$p'_{i,1} = cp_{i,1} + (1-c)p_{i,2} \text{ and } p'_{i,2} = (1-c)p_{i,1} + cp_{i,2}$$

meet the constraint, and then $$p'_{i,1} \text{ and } p'_{i,2},$$

as two new chromosomes, replace the original chromosomes $p_{i,1}$ and $p_{i,2}$.

Step (6), Mutation $P_u$ is defined as a mutation probability. An expected number $P_c$*M of chromosomes in the population perform mutation operation. Assuming that $p_{i,1}$ is a chromosome to perform mutation operation, a mutation direction d is randomly selected, and then a random number a is generated from $$(0, p_i^{max}) \text{ until } p'_{i,1} = p_{i,1} + \alpha d$$

meets the constraint.

$$p'_{i,1}$$

replaces the original chromosome $p_{i,1}$.

Step (7), Termination Condition

After the operations of selection, crossover and mutation, a new population is obtained and a next evolution is prepared. When the number of cycles of the above steps reaches a predetermined number of cycles, the genetic algorithm is stopped. After the algorithm is stopped, a chromosome having a highest fitness is selected from a last generation of chromosomes to obtain the global optimal solution of the optimization problem, where the solution is the optimal transmission power of UEi.

Fourth Embodiment

A method for solving the offloading decision is provided according to this embodiment.

The user obtains the offloading decision based on the energy consumption budget and delay estimation of the local computing and the energy consumption budget and delay estimation of the edge computing. After obtaining the optimal allocation strategy for the local computing resource allocation and the optimal allocation strategy for transmission power and edge computing resource allocation, the optimization problem P2 may be expressed as the following task offloading decision sub-problem:

$$P2\text{-}3: \min_{\pi_i} \underbrace{(1-\pi_i)\kappa_i D_i L_i f_i^{l*}}_{\text{local computing}} + \underbrace{\pi_i \frac{D_i p_i^*}{R_i(p_i^*)}}_{\substack{\text{first stage of}\\ \text{edge computing}}} + \underbrace{\frac{1}{S}\sum_{s=1}^{S} \pi_i \gamma D_i L_i f_{i,\omega_i}^{e*}\left(p_i^*, T_i^{wait}(\omega_s)\right)}_{\substack{\text{second stage of}\\ \text{edge computing}}} \tag{18}$$

The constraint includes the equation (8-f).

In the optimization problem P2-3, the only variable is the offloading decision $\pi i \in \{0,1\}$. Therefore, the optimization problem P2-3 is a 0-1 programming problem. In the present disclosure, 0 and 1 are respectively substituted into the problem P2-3 with an enumeration algorithm to obtain different target function values, and then the target function values are compared. $\pi_i$ corresponding to a smaller target function value is the optimal offloading decision. The closed expressions are expressed as:

$$\begin{cases} \pi_i^* = 0 \ \text{ if } \ \kappa_i D_i L_i f_i^{l*} \le \dfrac{D_i p_i^*}{R_i(p_i^*)} + \dfrac{1}{S}\displaystyle\sum_{s=1}^{S} \gamma D_i L_i f_{i,\omega_s}^{e*}\left(p_i^*, T_i^{wait}(\omega_s)\right) \\ \pi_i^* = 1 \ \text{ if } \ \kappa_i D_i L_i f_i^{l*} > \dfrac{D_i p_i^*}{R_i(p_i^*)} + \dfrac{1}{S}\displaystyle\sum_{s=1}^{S} \gamma D_i L_i f_{i,\omega_s}^{e*}\left(p_i^*, T_i^{wait}(\omega_s)\right) \end{cases} \tag{19}$$

Fifth Embodiment

In this embodiment, relevant simulation experiments are carried out in order to verify the effectiveness of the present disclosure.

In the present disclosure, the task offloading and resource allocation method (SS_2SSP) in an uncertain network environment according to the present disclosure is simulated and verified by using a MATLAB tool. In order to verify the performance of the method, comparison algorithms include the following three strategies.

(1) A Maximum Waiting Time based Static Offloading (MWT_SO) strategy, in which the user optimizes the transmission power and the edge computing resources in a static network where the task has maximum queue waiting time at the MEC server.

(2) Greedy offloading strategy, in which the user optimizes, in the static network where the task has maximum queue waiting time at the MEC server and at a maximum CPU frequency of the MEC server, the transmission power based on a Greedy offloading strategy.

(3) OnlyLocal computing strategy, in which the user processes the task only locally.

In the present disclosure, a scenario of a single MEC server is considered. The queue waiting time at the MEC server follows an exponential distribution, and an average queue waiting time ranges from 0.1 s to 4 s. Unless otherwise specified, the number K of samples of the queue waiting time is 100; the computing density L is 700 cycles/bit; the local CPU frequency ranges from 100 MHz to 2500 MHz; the CPU frequency of the MEC server ranges from 500 MHz to 5000 MHz; the local effective energy coefficient $k_i$ is $10^{-7}$; the effective energy coefficient $\gamma$ of the MEC server is $10^{-8}$; the channel gain $h_i$ is $10^{-2}$; the transmission power ranges from 5 dBm to 33 dBm; the transmission bandwidth $B_0$ is 30 MHz; the white noise power $N_0$ is −50 dBm; the size M of the population is 140; the number of iterations is 200; the crossover probability $P_c$ is 0.6; the mutation probability $P_u$ is 0.01; and the number of independent repeated experiments is 10.

Figure 3:
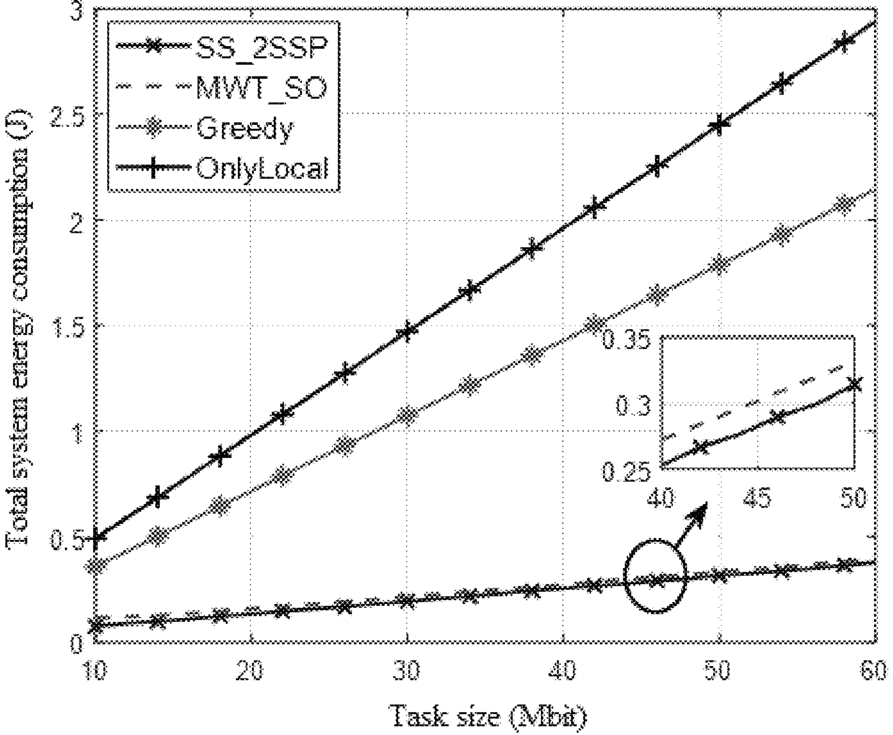
FIG. 3 is a schematic diagram showing changes of total system energy consumption with task size by using different algorithms.

FIG. 3 is a schematic diagram showing changes of total system energy consumption with task size by using different algorithms. In FIG. 3, a computing delay requirement of each of tasks is 1 s/Mbit, the length of the maximum queue waiting time at the MEC server is 5 s, and the length of the average queue waiting time is 2 s. It can be seen from FIG. 3 that with the increase of the task size, the total system energy consumptions by using different algorithms increase, and the total system energy consumption corresponding to the SS_2SSP algorithm according to the present disclosure is the lowest. In the SS_2SSP algorithm, the power transmission strategy is determined in the first stage considering the impact of all possible queue waiting time in the future. After the task is updated to the MEC server, the queue waiting time is obtained, and then the MEC server, based on the computing delay constraint of the user and the power transmission allocation strategy in the first stage, adopts the recourse strategy in the second stage, that is, the CPU frequency allocation strategy, compensating for the inaccurate prediction at the first stage. The MWT_SO algorithm is a static offloading strategy based on the maximum queue waiting time on the MEC server without the recourse operation. In a case that the average queue waiting time at the MEC server is small, the delay requirement is met with high energy consumption by using the MWT_SO algorithm. The Greedy algorithm is performed based on the maximum queue waiting time, and the maximum CPU frequency resource of the MEC server is greedily used. Compared with the MWT_SO algorithm and the SS_2SSP algorithm, the system energy consumption is higher by using the Greedy algorithm. For the OnlyLocal algorithm, all the tasks are processed locally, so that the system energy consumption is highest by using the OnlyLocal algorithm compared with other algorithms.

Figure 4:
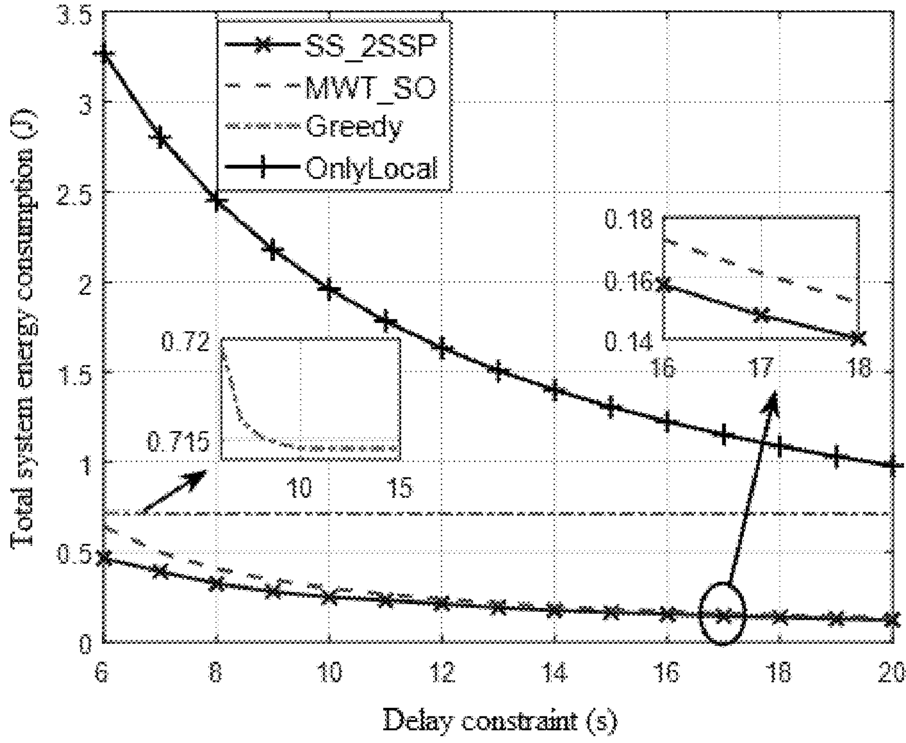
FIG. 4 is a schematic diagram showing changes of total system energy consumption with a delay constraint by using different algorithms.

FIG. 4 is a schematic diagram showing changes of total system energy consumption with a delay constraint by using different algorithms. In FIG. 4, the number of users is 1, the task size is 20 Mbit, the length of the maximum queue waiting time at the MEC server is 2.5 s, and the length of the average queue waiting time is 1 s. As can be seen from FIG. 4 that, with the increase of the delay constraint, the total system energy consumption decreases. The total system energy consumption corresponding to the SS_2SSP algorithm according to the present disclosure is the lowest. The total system energy consumption corresponding to the MWT_SO algorithm which is based on the maximum queue waiting time is higher. Compared with the MWT_SO algorithm, the CPU frequency of the MEC server is not optimized by the Greedy algorithm, thereby achieving larger system energy consumption. For the OnlyLocal algorithm, all the tasks are processed locally. Due to the limitations of local computing performance and computing resources, highest the system energy consumption is achieved by using the OnlyLocal algorithm compared with other algorithms.

Although the embodiments of the present disclosure are shown and described, it can be understood by those skilled in the art that various changes, modifications, substitutions and variations may be made to these embodiments without departing from the principle and spirit of the present disclosure. The scope of the present disclosure is limited by the claims and equivalents of the claims.

The invention claimed is:

1. A task offloading and resource allocation method in a Mobile Edge Computing (MEC) network environment with an uncertain task computing delay, performed by an electronic device, comprising:

modeling queue waiting time of a task at an MEC server as a group of random parameters based on a stochastic programming theory, and modeling a task offloading process as a two-stage offloading model;

modeling, based on the two-stage offloading model and under a delay constraint, an optimization problem as a task offloading and resource allocation problem based on two-stage stochastic programming to minimize total system energy consumption;

transforming, based on a stochastic simulation algorithm, the task offloading and resource allocation problem based on two-stage stochastic programming to a sample mean approximation problem;

decoupling the sample mean approximation problem to a local computing resource allocation sub-problem, a transmission power and edge computing resource joint allocation sub-problem, and an offloading decision sub-problem;

obtaining, based on a Lagrange multiplier algorithm, an optimal allocation strategy for the local computing resource allocation sub-problem;

obtaining, based on a genetic algorithm, an optimal allocation strategy for the transmission power and edge computing resource joint allocation sub-problem;

obtaining an optimal strategy for the offloading decision sub-problem by analyzing delay estimation and energy consumption budget of local computing and delay estimation and energy consumption budget of edge computing; and performing task offloading on the electronic device based on the optimal allocation strategy for the local computing resource allocation sub-problem, the optimal allocation strategy for the transmission power and edge computing resource joint allocation sub-problem, and the optimal strategy for the offloading decision sub-problem.

2. The task offloading and resource allocation method in an MEC network environment with an uncertain task computing delay according to claim 1, wherein in the two-stage offloading model, an offloading decision process comprises two stages, wherein in a first stage, a decision variable is a transmission power of the task, wherein in a case that the user does not obtain uncertain queue waiting time at the MEC server, a transmission power allocation strategy $p_i$ in the first stage is determined based on influence of all possible queue waiting time in future; and in a second stage, a decision variable is CPU frequency resource of the MEC server, wherein the queue waiting time is obtained after the task is uploaded to the MEC server, and the MEC server, after obtaining the queue waiting time and the transmission power allocation strategy $p_i$ in the first stage, performs an recourse operation based on the delay constraint to compensate for the transmission power allocation strategy in the first stage.

3. The task offloading and resource allocation method in an MEC network environment with an uncertain task computing delay according to claim 1, wherein the task offloading and resource allocation problem based on two-stage stochastic programming is expressed as:

$$\underset{\pi, f^l, f^e, p}{\text{Min}} : \sum_{i=1}^{N}(1-\pi_i)\kappa_i D_i L_i f_i^l + \sum_{i=1}^{N}\pi_i \frac{D_i p_i}{R_i(p_i)} + \Omega\left[\sum_{i=1}^{N}\pi_i \gamma D_i L_i f_{i,\omega}^e\left(p_i, T_i^{wait}(\omega)\right)\right]$$

and the constraint comprises:

$$p_i^{min} \le p_i \le p_i^{max},$$

$$f_i^{l,min} \le f_i^l \le f_i^{l,max},$$

$$f^{e,min} \le f_i^l \le f^{e,max},$$

$$T_i^{loca}\left(f_i^l\right) \le \tau_i,$$

$$T_i^{tran}(p_i) + T_i^{wait}(\omega) + T_i^{comp}\left(f_{i,\omega}^e \mid p_i, T_i^{wait}(\omega)\right) \le \tau_i, \forall \omega \in \Omega, \text{ and}$$

$$\pi_i \in \{0, 1\}$$

where $\pi=\{\pi_1, \pi_2, \ldots, \pi_N\}$ representing a set of task offloading decisions, N represents the number of users requesting task processing, $$f^l = \{f_1^l, f_2^l, \ldots, f_N^l\}$$

representing a set of local CPU frequency resource allocation strategies, $$f_i^l$$

represents a local Cru frequency resource allocation strategy of an (i)th user, $$f^e = \{f_{1,\Omega}^e, f_{2,\Omega}^e, \ldots, f_{N,\Omega}^e\}$$

representing a set of CPU frequency resource allocation strategies of the MEC server in all combination scenarios, $$f^e_{1,\Omega} = \{f^e_{i,\omega_1}, f^e_{i,\omega_2}, \ldots\}$$

representing a set of queue waiting time of the (i)th user at the MEC server, p={$p_1$, $p_2$, . . . . $P_N$} representing a set of user task transmission power allocation strategies, $p_N$ represents an (N)th user task transmission power allocation strategy, $\pi_i$ represents an offloading decision of the (i)th user, $K_i$ represents an effective energy coefficient related to a chip architecture of the (i)th user, $D_i$ represents the size of the task to be computed, $L_i$ represents the number of CPU cycles required for a task of one bit, $R_i$ represents a transmission rate of the (i)th user offloading the task to the MEC server, $\gamma$ represents an effective energy coefficient related to a chip architecture of the MEC server, $\tau_i$ represents a maximum delay for computing to perform the task, $E_\Omega[\cdot]$ represents an expectation of the combination scenarios, $$p_i^{min}$$

represents a minimum transmission power, $$p_i^{max}$$

represents a maximum transmission power, $$f_i^{l,min}$$

represents a minimum local CPU frequency, $$f_i^{l,max}$$

represents a maximum local CPU frequency, $f^{e,min}$ represents a minimum CPU frequency of the MEC server, $f^{e,max}$ represents a maximum CPU frequency of the MEC server, $$T_i^{wait}(\omega)$$

represents the queue waiting time of the (i)th user in a case that a combination is implementation as $$\omega, T_i^{loca}(f_i^l)$$

represents a local computing delay of the (i)th user, $$T_i^{tran}(p_i)$$

represents a communication delay of task uploading in a case that the (i)th user offloads the task to the MEC server for processing, and $$T_i^{comp}(f^e_{i,\omega} \mid p_i, T_i^{wait}(\omega))$$

represents a computing delay of the (i)th user at the MEC server.

4. The task offloading and resource allocation method in an MEC network environment with an uncertain task computing delay according to claim 1, wherein the transforming, based on a stochastic simulation algorithm, the task offloading and resource allocation problem based on two-stage stochastic programming to a sample mean approximation problem is expressed as:

$$\underset{\pi, f^l, f^e, p}{\text{Min}} : \sum_{i=1}^{N}(1-\pi_i)\kappa_i D_i L_i f_i^l + \sum_{i=1}^{N}\pi_i \frac{D_i p_i}{R_i(p_i)} + \frac{1}{S}\sum_{s=1}^{S}\sum_{i=1}^{N}\pi_i \gamma D_i L_i f^e_{i,\omega_s}(p_i, T_i^{wait}(\omega_s))$$

and the constraint comprises:

$$p_i^{min} \le p_j \le p_i^{max},$$
$$f_i^{l,min} \le f_i^1 \le f_i^{l,max},$$
$$f^{e,min} \le f_i^l \le f^{e,max}$$
$$T_i^{loca}(f_i^l) \le \tau_i,$$
$$T_l^{tran}(p_i) + T_l^{wait}(\omega_S) + T_i^{comp}(f^e_{i,\omega} \mid p_i, T_{li}^{wait}(\omega)) \le \tau_i, \forall\, \omega_S \in \Omega, \text{ and}$$
$$\pi_i \in \{0, 1\}$$

where It $\pi$={$\pi_1$, $\pi_2$, . . . , $\pi_N$} representing a set of task offloading decisions, N represents the number of users requesting task processing, $$f^l = \{f_1^l, f_2^l, \ldots, f_N^l\}$$

representing a set of local CPU frequency resource allocation strategies, $$f_i^l$$

represents a local CPU frequency resource allocation strategy of an (i)th user, $$f^e = \{f^e_{1,\Omega}, f^e_{2,\Omega}, \ldots, f^e_{N,\Omega}\}$$

representing a set of CPU frequency resource allocation strategies of the MEC server in all combination scenarios, $$f^e_{i,\Omega} = \{f^e_{i,\omega_1}, f^e_{i,\omega_2}, \ldots\}$$

representing a set of queue waiting time of the (i)th user at the MEC server, p={$p_1$, $p_2$, . . . $p_N$} representing a set of user task transmission power allocation strategies, $p_N$ represents an (N)th user task transmission power allocation strategy, $\pi_i$ represents an offloading decision of the (i)th user, $\kappa_i$ represents an effective energy coefficient related to a chip architecture of the (i)th user, $D_i$ represents the size of the task to be computed, $L_i$ represents the number of CPU cycles required for a task of one bit, $R_i$ represents a transmission rate of the (i)th user offloading the task to the MEC server, $\gamma$ represents an effective energy coefficient related to a chip architecture of the MEC server, $\tau_i$ represents a maximum delay for computing to perform the task, $$p_i^{min}$$

represents a minimum transmission power, $$p_i^{max}$$

represents a maximum transmission power, $$f_i^{l,min}$$

represents a minimum local CPU frequency, $$f_i^{l,max}$$

represents a maximum local CPU frequency, $f^{e,min}$ represents a minimum CPU frequency of the MEC server, $$f^{e,max}$$

represents a maximum CPU frequency of the MEC server $$T_i^{wait}(\omega_s)$$

represents the queue waiting time of the (i)th user in a case that a combination is implementation as $$\omega_s,\ T_i^{loca}(f_i^l)$$

represents a local computing delay of the (i)th user, $$T_i^{tran}(p_i)$$

represents a communication delay of task uploading in a case that the (i)th user offloads the task to the MEC server for processing, $$T_i^{comp}(f_{i,\omega}^e|p_i,\ T_i^{wait}(\omega))$$

represents a computing delay of the (i)th user at the MEC server, $S=K^N$ representing the number of combination scenarios of the sample, and K represents the number of independent identically distributed samples extracted from a scenario set $\Omega_i$ of the (i)th user.

5. The task offloading and resource allocation method in an MEC network environment with an uncertain task computing delay according to claim 4, wherein in a case that a task offloading decision of the (i)th user is 0, that is, the (i)th user processes the task locally, an optimal CPU frequency allocation strategy in a case of local computing of the task is expressed as:

$$f_i^{l*} = \text{Max}\left\{\text{Min}\left\{\frac{D_i L_i}{\tau_i},\ f_i^{l,max}\right\},\ f_i^{l,min}\right\}$$

where $f_i^{l*}$ represents the optimal CPU frequency allocation strategy in a case of local computing of the task.

6. The task offloading and resource allocation method in an MEC network environment with an uncertain task computing delay according to claim 4, wherein in a case that a task offloading decision of the (i)th user is 1, that is, the (i)th user offloads the task to the server for computing, an optimal offloading strategy is calculated based on the genetic algorithm by:

performing floating-point vector coding on each of feasible transmission powers, wherein each of floating-point vectors represents a chromosome, and a dimension of the floating-point vector is consistent with a dimension of a solution vector;

randomly generating a point from a feasible region of transmission powers of the (i)th user; determining whether the point meets a constraint that a transmission delay of the user is less than a maximum transmission delay requirement; in a case that the point meets the constraint, determining the point as a chromosome; in a case that the point does not meet the constraint, generating another random point until the another random point meets the constraint; and repeating the above processing M times to generate M chromosomes as an initial population, wherein the M chromosomes is expressed as: $p_{i,1}$, $p_{i,2}$, . . . , $p_{i,M}$;

for each of the chromosomes $p_{i,m}$, solving a fitness function of the chromosome and calculating an evaluation function of the chromosome based on a fitness of the chromosome, wherein a greater value of the evaluation function of the chromosome indicates that a possibility of the chromosome is selected to generate offspring is greater, and the fitness is a sample mean approximation problem function;

for the chromosome $p_{i,m}$, calculating cumulative probabilities of first m chromosomes by using the following equation:

$$q_{i,m} = \sum_{j=1}^{m} eval(p_{i,j}),\ m = 1, 2, \ldots, M$$

for the chromosome $p_{i,m}$, generating a random number r from an interval (0, $q_{i,M}$), selecting the chromosome $p_{i,m}$ as a parent sample to reproduce a next generation of chromosomes in a case that $q_{i,m-1}<r<q_{i,m}$ and $q_{i,0}=0$, and selecting M chromosomes according to the above processing;

defining $P_c$ as a crossover probability, wherein an expected number $P_c$*M of chromosomes in the population perform crossover operation, that is, assuming that $p_{i,1}$ and $p_{i,2}$ are two chromosomes to perform crossover operation, a random number c is generated from an interval (0,1) until $$p'_{i,1} = cp_{i,1} + (1-c)p_{i,2} \text{ and } p'_{i,2} = (1-c)p_{i,1} + cp_{i,2}$$

meet the constraint that the transmission delay of the user is less than the maximum transmission delay requirement, then $$p'_{i,1} \text{ and } p'_{i,2}$$

replace the original chromosomes $p_{i,1}$ and $p_{i,2}$;

defining $P_u$ as a mutation probability, wherein an expected number $P_c$*M of chromosomes in the population perform mutation operation, that is, assuming that $P_{i,1}$ is a chromosome to perform mutation operation, a mutation direction d is randomly selected, a random number α is generated from $$(0, p_i^{max}) \text{ until } p'_{i,1} = p_{i,1} + \alpha d$$

meets the constraint, then $$p'_{i,1}$$

replaces the original chromosome $p_{i,1}$; and obtaining a new population after the selection operation, the crossover operation and the mutation operation, and preparing for a next evolution; when the number of cycles of the above operations reaches a predetermined number of cycles, stopping performing the genetic algorithm; and selecting, after stopping the genetic algorithm, a chromosome having a highest fitness from a last generation of chromosomes to obtain a global optimal solution of the optimization problem.

7. The task offloading and resource allocation method in an MEC network environment with an uncertain task computing delay according to claim 6, wherein fitness of the chromosomes are obtained, the chromosomes are sorted in an ascending order of the fitness, and the evaluation function of the chromosome $p_{i,m}$ is expressed as:

$$\text{eval}(p_{i,m})=\alpha(\mathbf{1}-a)^{m-1}, m=1,2, \ldots, M$$

where eval ($p_{i,m}$) represents the evaluation function of the chromosome $p_{i,m}$, a is a constant, and a α ∈ (0,1).

8. The task offloading and resource allocation method in an MEC network environment with an uncertain task computing delay according to claim 1, wherein an optimal offloading decision is expressed as:

$$\begin{cases} \pi_i^* = 0 \text{ if } \kappa_i D_i L_i f_i^{l*} \le \dfrac{D_i p_i^*}{R_i(p_i^*)} + \dfrac{1}{S}\sum_{s=1}^{S} \gamma D_i L_i f_{i,\omega_s}^{e*}\left(p_i^*, T_i^{wait}(\omega_s)\right) \\ \pi_i^* = 1 \text{ if } \kappa_i D_i L_i f_i^{l*} > \dfrac{D_i p_i^*}{R_i(p_i^*)} + \dfrac{1}{S}\sum_{s=1}^{S} \gamma D_i L_i f_{i,\omega_s}^{e*}\left(p_i^*, T_i^{wait}(\omega_s)\right) \end{cases}$$

where $\pi_i^*$ represents the optimal offloading decision, $f_i^{l*}$ represents an optimal CPU frequency allocation strategy in a case of local computing of the task;

$f_{i,\omega_s}^{e*}$ represents an optimal CPU frequency allocation strategy of the MEC server in all scenarios; and $p_i^*$ represents an optimal transmission power of an (i)th user.

9. The task offloading and resource allocation method in an MEC network environment with an uncertain task computing delay according to claim 7, wherein an optimal CPU frequency allocation strategy $f_{i,\omega_s}^{e*}$ of the MEC server in all scenarios is expressed as:

$$f_{i,\omega_s}^{e*} = \text{Max}\left\{\text{Min}\left\{\frac{D_i L_i}{\tau_i - T_i^{tran}(p_{i,m}) - T_i^{wait}(\omega_s)}, f^{e,max}\right\}, f^{e,min}\right\}$$

where $T_i^{tran}(p_{i,m})$ represents a communication delay of task uploading in a case that the (i)th user having a transmission power of $p_{i,m}$ offloads the task to the MEC server for processing.

* * * * *